(No Model.)
E. H. JOHNSON.
ELECTRICAL INDICATOR.
No. 537,118.  Patented Apr. 9, 1895.
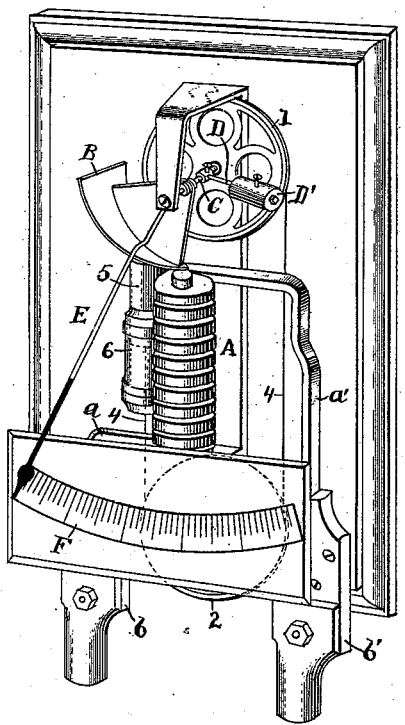
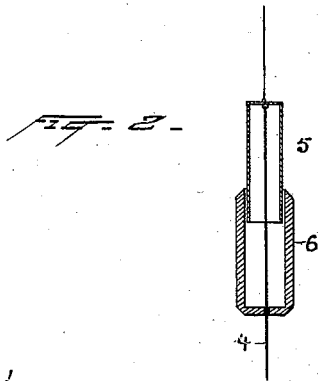
Witnesses:  Inventor
Edward H. Johnson
By his Attorneys

UNITED STATES PATENT OFFICE.

EDWARD H. JOHNSON, OF NEW YORK, N. Y., ASSIGNOR TO THE INTERIOR CONDUIT AND INSULATION COMPANY, OF SAME PLACE.

ELECTRICAL INDICATOR.

SPECIFICATION forming part of Letters Patent No. 537,118, dated April 9, 1895.

Application filed October 1, 1891. Serial No. 407,396. (No model.)

*To all whom it may concern:*

Be it known that I, EDWARD H. JOHNSON, a citizen of the United States, residing at New York city, in the county and State of New York, have invented a certain new and useful Improvement in Current-Meters, of which the following is a specification.

The object of my invention is to provide a meter or indicator of electricity which may be scaled to indicate either ampères or other electrical units, in which the indicator shall be provided with a dead-beat attachment which shall prevent over movements and oscillations upon changes of current and shall cause the indicator to stop in its movements positively at the point to which it is brought by the change of current.

In carrying my invention into effect I connect with the moving portion of the ampère meter an air dash-pot, the plunger of the dash-pot being preferably connected with the spindle carrying the indicator needle in such a way that a reciprocating movement is communicated to the plunger. The dash-pot comprises an elongated cylinder and an elongated plunger which enters said cylinder loosely and out of contact with the cylinder, the plunger being so supported as to be held centrally with relation to the circumference of the cylinder. This arrangement permits the air to enter and to escape with comparative freedom around the sides of the plunger as the latter moves in and out of the cylinder, and therefore the resistance opposed to the movement of the indicator by the dash-pot under gradual changes of current is too small to require correction; but such resistance is sufficient to oppose over movements of the indicator arising from sudden and violent variations. Furthermore, by maintaining the plunger out of contact with the cylinder, the element of friction is done away with and the uncertainty due to this cause is avoided. If the plunger were in contact with the cylinder the degree of friction would change as it moves in and out and would also vary when the instrument is in use on account of the oxidation of the parts, the accumulation of dust, &c., but with the arrangement which I employ this difficulty is avoided and the instrument is made a reliable and constant one.

The form of plunger and cylinder provides always a considerable body of air under compression and gives a uniform and steady movement.

My invention is illustrated in the accompanying drawings.

Figure 1 is a perspective view of an indicator embodying my invention; and Fig. 2, a vertical section of the dash-pot and plunger.

In Fig. 1 of the drawings I have illustrated my improvement in connection with an ampère meter of the type described in the application of Sigmund Bergmann and George A. Scott, Serial No. 382,691, filed February 25, 1891.

A in the drawings indicates an electro-magnet formed by winding a single metallic conductor into a helix, one end $a$ of the helix being carried to one terminal $b$ of the meter, and the other $a'$ to the other terminal $b'$, said terminals being in the form of metallic plates having provision for connection with the line wires of the circuit.

B is the armature of metal, moving on a spindle C as a center, in front of the pole of the electro-magnet, the portion of said armature moving in front of said pole being bent concentric to its axis and formed in the shape of a V with its apex in advance. Upon said spindle C is an arm D carrying an adjustable weight D' serving as a counterbalance to said armature. The indicator E is also carried by the spindle C and moves over the scale F.

The parts just described constitute a meter such as is described in said application of Bergmann and Scott.

On the passage of current the attraction of the electro-magnet A for the armature B is in proportion to the current strength, and as the indicator E moves with the armature, a reference to the scale will give the reading. Variations in current of course affect the position of the needle with reference to the scale. With this and other constructions of meter however the needle does not come to rest immediately upon the current becoming constant after a movement by change of current is effected.

Referring again to the drawings, my dead-beat attachment will be described.

Rigidly connected to the spindle C is the guide pulley 1 and at another point in the meter case is a similar guide pulley 2, the spindle of which is suitably supported in the base of the frame. Over these two pulleys, which are preferably grooved, runs a fine cord or wire 4, the ends of which are connected with the head of the plunger 5 of an air-dash-pot, whereby any movement of the pulleys will be communicated to said plunger. Said plunger 5 enters the hollow dash-pot 6, the upper end of which is open to receive it. The plunger is itself hollow and is open at its inner end and it fits loosely within the cylinder as shown, there being a slight space around the sides of the plunger within the cylinder. The size of this space will vary according to the size of the instrument, that is, the smaller the dash-pot, the smaller will be the annular space to give the necessary check to the movement. In every case, however, the plunger is out of contact with the cylinder and is held centrally by the tension of the cord or wire 4 which passes through a hole in the bottom of the cylinder and is attached to the head of the plunger within the same. On the inward movement of the plunger air is permitted to escape around its sides with some freedom, so that although a cushion is afforded to the inward movement sufficient to oppose excessive movements due to abrupt changes of current, yet resistance is not opposed to the movement of the needle to an extent sufficient to introduce error. Similarly on the outward movement of the plunger the air space around it permits the air to enter with sufficient rapidity not to unduly oppose the movement of the indicator, but not enough to allow too great movement under sudden changes of current. The indicator therefore responds immediately and exactly to the changes of current and comes instantly to a state of rest upon the current becoming stationary.

It is evident that the use of my dead-beat attachment is not confined to the special form of ampère meter herein shown and described, but may be applied to other forms and also to indicators for measuring volts or other electrical units.

What I claim is—

1. An electrical indicator wherein are combined an actuating coil, a movable armature mounted upon a spindle and properly counterbalanced, an indicating finger moved by said armature, a guide-pulley on the armature spindle, a second guide-pulley at a distance therefrom, a dash-pot and plunger located in line with the peripheries of said guide-pulleys, and a cord or wire passing over said guide-pulleys and attached to both sides of the dash-pot plunger, substantially as and for the purpose set forth.

2. In an electrical indicator, the combination of an indicating device, electro-magnetic means for moving said indicating device, and a retarding device, comprising an elongated dash-pot, an elongated hollow plunger open at its inner end, and a mechanical connection from both sides of said plunger to the indicating device, whereby the plunger is moved positively in both directions, substantially as set forth.

3. In an electrical indicator, the combination of a pivoted indicating device, electro-magnetic means for moving said indicating device in one direction, a counter-balance for moving it in the opposite direction, a pulley on the pivot of the indicating device, a dash-pot, a plunger adapted to work in the dash-pot, and a belt connected to both sides of said plunger and running over said pulley whereby the said plunger is moved positively in both directions through the movements of the indicating device, substantially as set forth.

This specification signed and witnessed this 24th day of September, 1891.

EDWARD H. JOHNSON.

Witnesses:
W. PELZER,
ARPAD VON BARBER.